Figure 1:
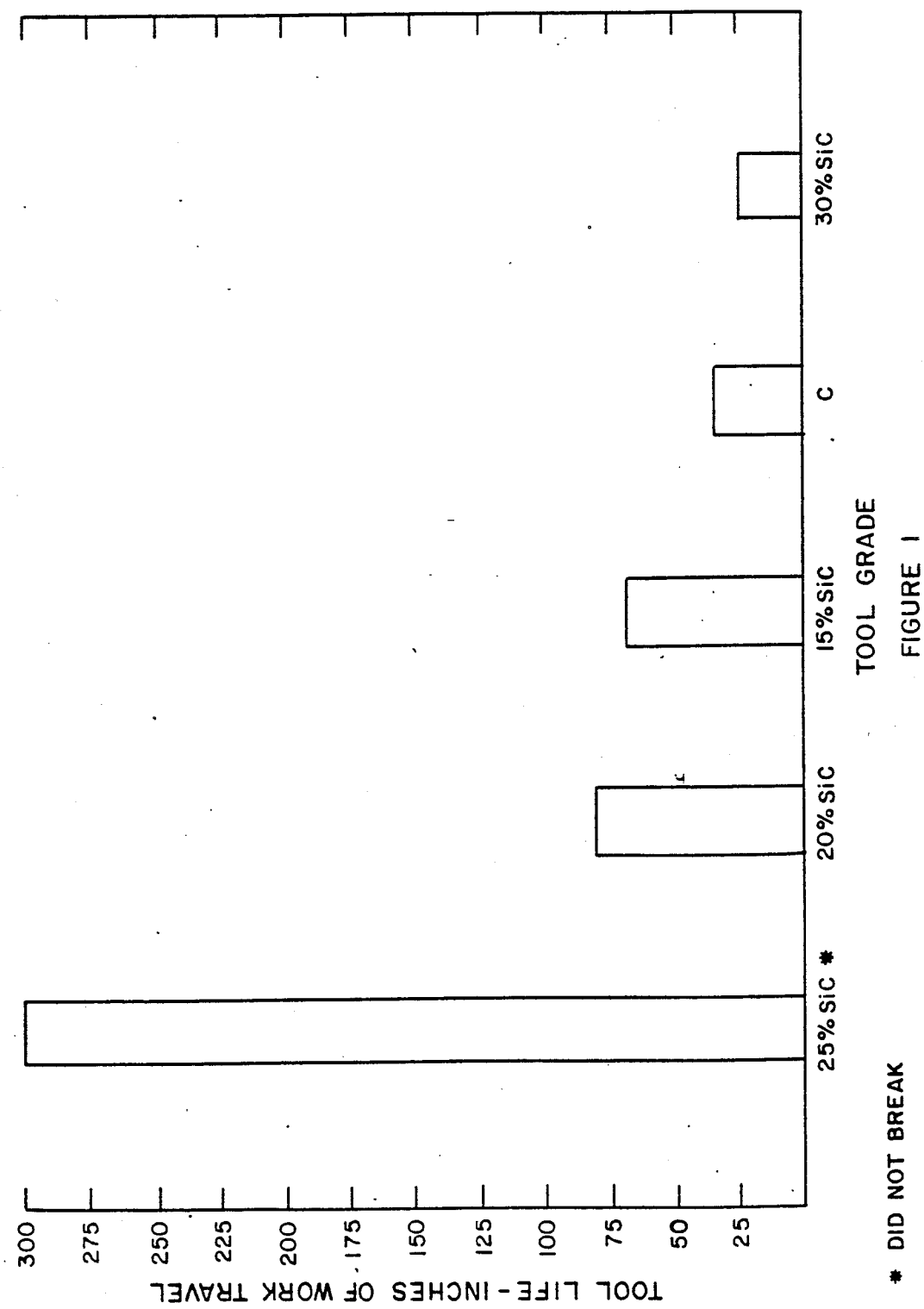

United States Patent [19]

Rhodes et al.

[11] Patent Number: 4,961,757
[45] Date of Patent: Oct. 9, 1990

[54] REINFORCED CERAMIC CUTTING TOOLS

[75] Inventors: James F. Rhodes, Greer; Chester J. Dziedzic, Greenville; Ronald L. Beatty, Greer, all of S.C.

[73] Assignee: Advanced Composite Materials Corporation, Greer, S.C.

[21] Appl. No.: 426,540

[22] Filed: Oct. 26, 1989

Related U.S. Application Data

[63] Continuation of Ser. No. 204,236, Jun. 9, 1988, abandoned, which is a continuation of Ser. No. 161,410, Feb. 23, 1988, Pat. No. 4,789,277, which is a continuation of Ser. No. 830,773, Feb. 18, 1986, abandoned, which is a continuation-in-part of Ser. No. 711,695, Mar. 14, 1985, abandoned.

[51] Int. Cl.$^5$ .............................................. B24D 3/34
[52] U.S. Cl. .................................... 51/309; 501/89; 501/92; 501/95; 501/97; 501/128
[58] Field of Search .................. 501/95, 89, 88, 127, 501/128, 153, 92, 98; 51/309

[56] References Cited

U.S. PATENT DOCUMENTS

| | | | |
|---|---|---|---|
| 492,767 | 2/1893 | Acheson . | |
| 560,291 | 5/1896 | Acheson . | |
| 718,892 | 1/1903 | Acheson . | |
| 722,792 | 3/1903 | Acheson . | |
| 722,793 | 3/1903 | Acheson . | |
| 723,631 | 3/1903 | Acheson . | |
| 1,028,303 | 6/1912 | Tone . | |
| 2,947,056 | 8/1960 | Csordas et al. | 264/56 |
| 2,979,414 | 4/1961 | Ryshkewitch | 501/89 |
| 3,335,049 | 8/1967 | Pultz . | |
| 3,386,840 | 1/1968 | Gruber | 501/88 |
| 3,407,090 | 10/1968 | Hertl . | |
| 3,459,842 | 8/1969 | Wakefield . | |
| 3,541,672 | 3/1970 | Hulse . | |
| 3,575,789 | 4/1971 | Siefert et al. . | |
| 3,813,340 | 8/1974 | Knippenberg . | |
| 3,833,389 | 9/1974 | Komeya et al. . | |
| 4,063,908 | 11/1977 | Ogawa . | |
| 4,158,687 | 6/1979 | Yajima et al. . | |
| 4,284,612 | 8/1981 | Horne . | |

(List continued on next page.)

FOREIGN PATENT DOCUMENTS

| | | |
|---|---|---|
| 767030 | 5/1971 | Belgium . |
| 8963969 | 10/1974 | Japan . |
| 47803 | 4/1977 | Japan . |
| 59-137366 | 1/1983 | Japan . |
| 58-48621 | 10/1983 | Japan . |
| 59-54680 | 3/1984 | Japan . |
| 59-102861/2 | 6/1984 | Japan . |
| 60-05079 | 1/1985 | Japan . |
| 381645 | 5/1971 | U.S.S.R. . |
| 954285 | 3/1984 | United Kingdom . |

OTHER PUBLICATIONS

"Transformation Toughened and Whisker Reinforced Ceramics", Becher and Wei Soc. Automotive Engineers, Proc. 21st Auto Tech. Dev. Meet., 201-205, Mar., 1984.
"Silicon Carbide Whisker-Reinforced Aluminum Oxide", Wei and Beatty, Amer. Ceramic Soc. Fall 84 Meeting, (Only Slides Given).
"Toughening Behavior in SiC-Whisker Reinforced Alumina", Becher and Wei, Comm. Amer. Ceramic Soc., C267-269, Dec. 1984.
"Development of SiC Whisker-Reinforced Ceramics", Wei and Becker, Am. Ceram. Soc. Bull., 64 (2), 298-304, 1985.
"High Strength Silicon Carbide Fibre-Reinforced
(List continued on next page.)

*Primary Examiner*—Karl Group
*Attorney, Agent, or Firm*—Banner, Birch, McKie & Beckett

[57] ABSTRACT

Cutting tools are disclosed which are comprised of composite bodies comprising a ceramic matrix reinforced by ceramic whiskers. The ceramic matrix may be alumina or silicon nitride, and may contain toughening components. The whiskers are preferably silicon carbide, but may be other known ceramic whiskers. Whisker content in the composite is 2-40%, with higher contents generally used for tools when the expected service involves interrupted cutting and lower contents generally used for continuous cutting tools.

14 Claims, 2 Drawing Sheets

U.S. PATENT DOCUMENTS

| | | |
|---|---|---|
| 4,314,852 | 2/1982 | Brennan . |
| 4,323,323 | 4/1982 | Lumby . |
| 4,343,909 | 8/1982 | Adams . |
| 4,366,254 | 12/1982 | Rich . |
| 4,388,255 | 2/1983 | Simpson . |
| 4,410,635 | 10/1983 | Prewo . |
| 4,412,854 | 11/1983 | Layden . |
| 4,463,058 | 7/1984 | Hood . |
| 4,464,192 | 8/1984 | Layden et al. . |
| 4,485,179 | 11/1984 | Brennan . |
| 4,500,504 | 2/1985 | Yamamoto . |
| 4,507,224 | 3/1985 | Toibana et al. . |
| 4,526,875 | 11/1985 | Yamamoto . |
| 4,543,343 | 6/1985 | Iyori . |
| 4,543,345 | 9/1985 | Wei ............................... 501/95 |
| 4,554,201 | 11/1985 | Andreev . |
| 4,585,500 | 4/1986 | Minjolle et al. . |
| 4,657,877 | 4/1987 | Becher et al. ................... 501/89 |
| 4,666,467 | 5/1987 | Matsumoto et al. ........... 501/105 X |
| 4,673,658 | 6/1987 | Gadkaree et al. ............. 501/89 |
| 4,749,667 | 6/1988 | Jun et al. ...................... 501/95 X |

OTHER PUBLICATIONS

Glass–Matrix Composites", K. M. Prewo, J. J. Brennan, J. Material Sci., 15 (1980) 463–468.

"Silicon Carbide Fiber Reinforced Glass–Ceramic Matrix Composites Exhibiting High Strength and Toughness", K. M. Prewo, J. J. Brennan, J. Material Sci., 17 (1982) 2371–2383.

"Silicon Carbide Yarn Reinforced Glass Matrix Composites", K. M. Prewo, J. J. Brennan, J. Material Sci., 17 (1982) 1201–1206.

"Fabrication of Silicon Carbide Whisker–Silicon Nitride Composite Materials and their Physical Properties" Tamari et al., Osaka Kogyo Gijutsu Kiho, 33(2), 129–134, 1962.

"Studies on the Application of Hot–Pressed Silicon Nitride Ceramics as Cutting Tools", Miao Ho–Cho et al., Ceramurgia International, vol. 6, No. 1, 1980.

"Silicon Nitride Ceramic Composites with High Toughness", M. W. Lindley, and D. J. Godfrey, Nature, Sol. 229, Jan. 15, 1971.

"Fiber Reinforced Ceramics", D. J. Phillips, Material Development Division A.E.R.E., Harwell, Feb. 1981.

"Materials and Processes in Manufacturing", 3rd Ed., ch. 16, Degarmo.

"Practical Machining Principles for Shop Application", Metcut Research Association, Inc. 1981.

Chemical Engineers Handbook, 5th Ed.., 1973, 21–30 to 21–36, Perry.

"Handbook of Fillers and Reinforcement for Plastics", Katz, et al. (1978) 446–464.

"Short Fiber Reinforcement: Where the Action Is", J. V. Milewski, Plastics Compounding, Nov./Dec. 1979, 17–37.

Knippenberg, "Growth Phenomena in Silicon Carbide", Philips Research Reports, v. 18, pp. 161–274 (1963).

Ridgway, "Temperature Measurement in Commerical Silicon Carbide Furnaces", Trans Electrochem., Soc., v. 61, pp. 217–232 (1932).

Mellor, A Comprehensive Treatise On Inorganic and Theoretical Chemistry, v. V, pp. 875–887 (1940).

Tone, "Carbide of Silicon—Its Purpose and Use in Steel", The Iron Age, v. 63, No. 5, (1899).

Tiegs et al., "Interfaces in Alumina–SiC Whisker Composites", Ceramic Microstructures '86: Role of Interfaces, Materials Science Research Series No. 21, Plenum Press, New York (1987).

Ruff, "The Formation and Dissociation of Silicon Carbide", Trans. Elect. Soc., v. 68, pp. 87–109 (1935).

Iley et al., "Deposition of Carbon on Vitreous Silica", J. Chem. Soc., pp. 1362–1366 (1948).

Coes, Jr., Abrasives, "Chapter 9 Silicon Carbide", pp. 68–75, 166–167, Springer–Verlag, New York (1971).

Moser, Microstructures of Ceramics—Structure and Properties of Grinding Tools, pp. 118–127, 130–131, 144–149, 195–199, Akademiai Kiado, Budapest (1980) (English translation by I. Finaly).

Whitney et al., "Final Report on Development of Improved Cutting Tool Materials", Oct. 1965, AFML–TR–65–306.

Whitney et al., "New and Improved Cutting Tool Materials", Mar. 1969, AFML–TR–69–50.

REINFORCED CERAMIC CUTTING TOOLS

This application is a continuation of copending application Ser. No. 204,236 (filed June 9, 1988) now abandoned; which was continuation of application Ser. No. 161,410 (filed Feb. 23, 1988) now issued as U.S. Pat. No. 4,789,277; which was a continuation of now abandoned application Ser. No. 830,773 (filed Feb. 18, 1986); and which was a continuation-in-part of now abandoned application Ser. No. 711,695 (filed Mar. 14, 1985).

FIELD OF THE INVENTION

The invention herein relates to cutting tools. More particularly it relates to improved ceramic cutting tools.

BACKGROUND OF THE INVENTION

Metal cutting or "machining" is recognized to be one of the most important and most widely used processes is manufacturing. Among the common machining operations are shaping, planing, milling, facing, broaching, grinding, sawing, turning, boring, drilling and reaming. Some of these processes, such as sawing, operate on both the external and internal surfaces of the workpiece, while others operate only on the internal (e.g. reaming) or external (e.g. milling) surfaces of the workpiece. These various processes are described in detail in DeGarmo, *Materials and Processes in Manufacturing*, 3rd edn., 1969), especially in chapter 16, "Metal Cutting".

The measure of productivity of a given machining operation is determined by the total amount of metal removed from the workpiece in a given period of time. To this end a wide variety of materials have been used or suggested as cutting tools. These are commonly classified as tool steels, high speed steels, cast non-ferrous alloys, sintered carbides and ceramics. (There are also some limited applications for diamonds). The commonly measured parameters of cutting tool performance are cutting speed, depth of cut, feed rate and tool life. Each of these prior art cutting tool materials is deficient in one or more of these parameters. Tool steel, high speed steel and cast non-ferrous alloys all have critical temperature limitations which restrict their cutting speed to relatively low rates, as measured in feet per minute (fpm) or meters per minute (m/min). Typically high speed steels are restricted to 100-225 fpm (30-70 m/min) for cutting steel and 250-300 fpm (75-90 m/min) for cutting non-ferrous materials. The cast non-ferrous alloys will operate at up to about twice those rates. The carbide materials, such as tungsten carbide, improve on the cutting speed rates of the steels by a factor of 2-5, particularly when the carbides are coated. However, the carbides are not as tough as the steels and are susceptible to impact breakage. This severely limits their usage to applications where impact is a factor, such as in making interrupted cuts or in machining hard workpieces.

Ceramic materials, such as alumina, have been found to produce cutting tools which can operate at much higher speeds than the conventional steel and carbide cutting tools. For instance, cutting speeds of 500-1400 fpm (150-430 m/min) for steel cutting have been reported. Tool life with the ceramics, however, has been a serious problem, because the ceramics are even more brittle and less tough than the carbides. Of particular concern has been the tendency of the ceramic materials to fracture catastrophically and unexpectedly when subjected to impact. Thus, while cutting speeds have been high for the ceramic materials, it has been possible to operate them only at quite low feed rates, much lower than those used for the steels and carbide cutting tools.

It has thus been found that productivity, which is a function of both cutting speed and feed rate is relatively low for all prior art types of cutting tools. The steel and carbide tools, while having high feed rates, have relatively low cutting speeds. Conversely, the ceramics, while having high cutting speeds, operate only at low feed rates. Productivity, determined as total amount of metal removal for a given time period, therefore remains relatively low regardless of the type of cutting tool used.

References relating to the use of various ceramics as cutting tools include U.S. Pat. No. 4,543,343 to Iyori et al which describes use of a ceramic comprised of alumina, zirconia and titanium carbide together with titanium boride. Another reference is U.S. Pat. No. 4,366,254 which describes a cutting tool ceramic comprised of alumina and zirconia together with carbides, nitrides or carbo-nitrides of Group IVB and VB metals.

There have been some teachings that silicon carbide fiber reinforced ceramics ca be used in various machine parts. Examples shown have included heat exchangers, molds, nozzles, turbines, valves and gears; see Japanese patents nos. 59-54680 and 59-102681. Such disclosures, however, are not particularly pertinent to the cutting tool invention described herein, since such parts are not subject to impact stresses as part of their normal service environment. No mention is made of improved toughness or impact resistance nor are such properties of interest in the articles described.

It has also been disclosed that fracture toughness in ceramics can be improved by incorporation of silicon carbide whiskers into the ceramics. Two papers by Becher and Wei have described mechanisms for increase in toughness as related to whisker content and orientation; see "Toughening Behavior is SiC Whisker Reinforced Alumina", *Comm. Am. Cer. Soc.* (Sept., 1984) and "Transformation Toughened and Whisker Reinforced Ceramics", *Soc. Auto. Engrs.*, Proc. 21st Auto. Tech. Dev. Mtg., 201-205 (Mar., 1984). See also Wei U.S. Pat. No. 4,543,345. These papers, however, deal only with thermal and flexural applications and do not address anything with respect to machining processes. It would therefore be highly advantageous to have a tool which operates at the high cutting speeds of the ceramics while also allowing the high feed rates found with the steels and carbides. Such cutting tools would yield productivities significantly higher than any of the prior art tools.

BRIEF SUMMARY OF THE INVENTION

The invention herein, in its broadest form, is a cutting tool composed of a composite comprising a ceramic matrix having distributed therethrough reinforcement comprising ceramic whiskers.

In a preferred embodiment the ceramic matrix comprises alumina, either pure or with inclusions of modifying materials. Alternative ceramic matrices include those of silicon nitride, which may also include modifying components.

Most preferred of the reinforcing ceramic whiskers are those of silicon carbide. Other whiskers which may be suitable will include alumina, aluminum nitride, beryllia, boron carbide, graphite and silicon nitride. In any given tool the whisker reinforcement must of course be of a material which is compatible with the ceramic matrix and with which it forms adequate reinforcement bonding.

The whisker content in the ceramic matrix is 2 to 40 volume percent whiskers. A formulation comprised of 25 volume percent silicon carbide whiskers in alumina matrix has been found to be a particularly outstanding ceramic cutting tool.

THE DRAWINGS

Figure 2:
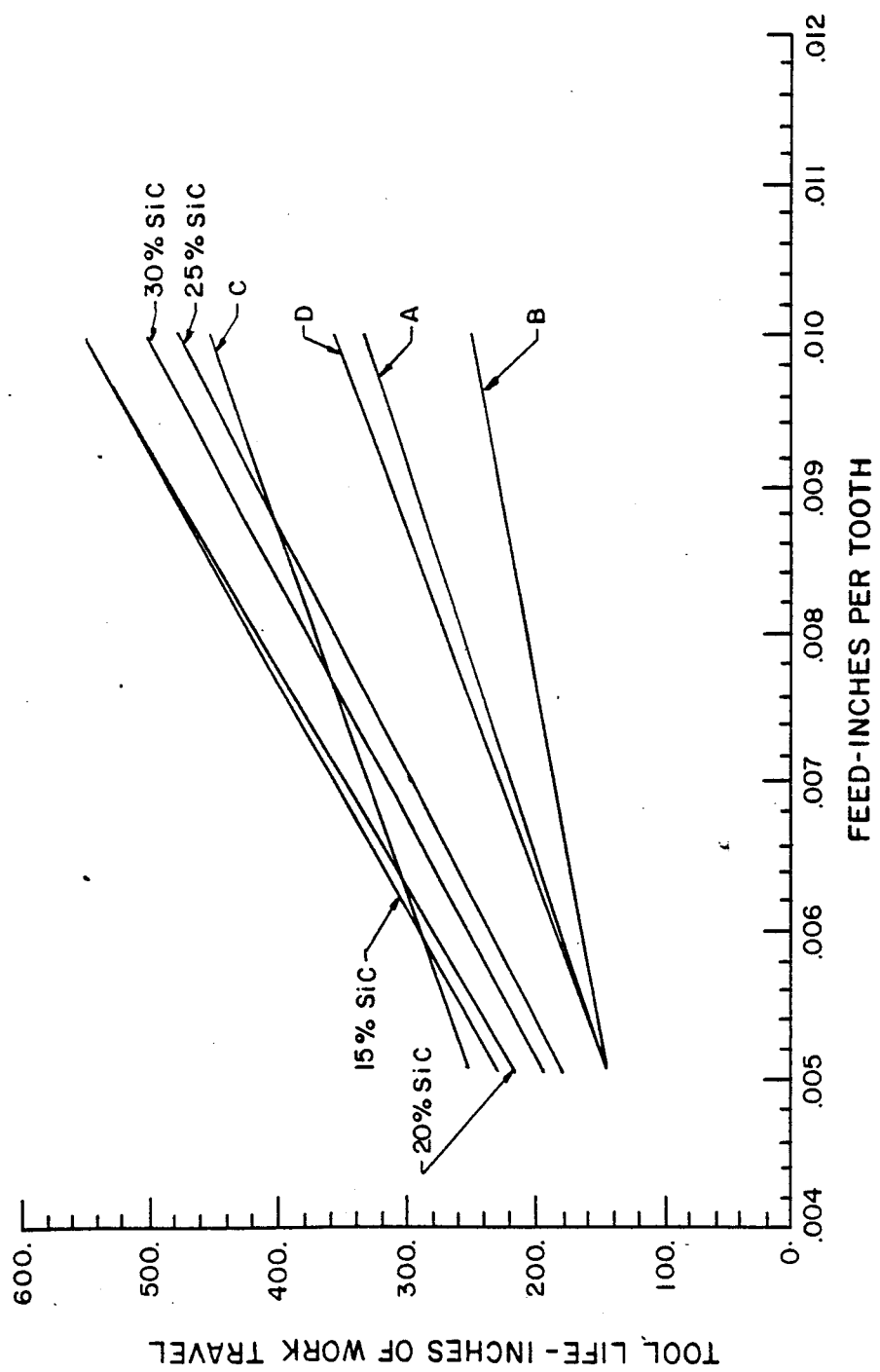

FIGS. 1 and 2 graphically compare face milling results obtained with cutting tools of the invention with those obtained with conventional cutting tools.

MODES FOR CARRYING OUT THE INVENTION

Cutting tools represent a unique and highly specialized class of industrial articles. Cutting tool geometry is such that intense cutting stresses are localized and concentrated at the cutting edge of the tool. The work required to deform the workpiece and generate the chip, as well as the friction between the chip and the face of the cutting tool, causes considerable heat to be generated in the cutting tool. The properties of the workpiece, such as its ductility or hardness, can further intensify the stresses and operating temperatures to which the cutting tool is subject. A cutting tool is also subject to varying degrees of impact, particularly when making intermittent cuts, but also dependinq on whether the workpiece tends to form continuous or discontinuous chips. A detailed discussion of these types of service conditions, as well as a description of the various tool geometries, is found in the aforementioned DeGarmo reference. Thus the critical and unique combination of operating stress, temperature and impact makes the determination of materials suitable for use as cutting tools significantly different from the determination of materials for other industrial articles such as heat exchangers or gears.

The present invention is based upon the discovery that incorporation of a defined content of ceramic reinforcing whiskers in a ceramic matrix yields a cutting tool structure that not only retains the high cutting speeds of prior art unreinforced ceramics but unexpectedly also permits ceramics to operate at the high speed feed rates previously obtainable only with the steels and carbides, and even with the latter only at the cost of greatly reduced cutting speed.

The ceramics which can form the matrix body of the cutting tool are any of the ceramic materials which have previously been found useful as cutting tools in the unreinforced condition. The most important of these is alumina. Alumina may be used either alone (i.e. containing no other materials except recognized impurities) or it may be combined or "doped" with minor amounts (i.e. less than about 30%) of toughening components such as zirconia, yttria, hafnia, magnesia, silicon nitride and titanium carbide or mixtures thereof. The Becher et al SAE paper cited above shows typical compositions containing up to 30 volume percent zirconia, with the zirconia incorporating up to 3 mole percent yttria. Other ceramics which can serve as cutting tool matrices include silicon nitride, which may also include modifying components.

The reinforcing whiskers most advantageously used are silicon carbide whiskers. Both the alpha and beta forms of silicon carbide whiskers are available commercially and can be employed. The whiskers used in this invention have a single crystal or monocrystalline structure. A particularly preferred commercial source is those silicon carbide whiskers produced and marketed by the Advanced Materials group of ARCO Chemical Company. Such whiskers ar produced from rice hulls and typically have average diameters on the order 0.6 um and aspect ratios on the order of 15-150. Strengths are typically on the order of 1 million psi (70,000 kg/cm$^2$) and tensile moduli on the order of 60-100 million psi (4-7 million kg/cm$^2$). The silicon carbide whiskers are thermally stable to 3200° F. (1760° C.). Other whiskers which may be suitable will include alumina, aluminum nitride, beryllia, boron carbide, graphite and silicon nitride. Mixtures of whiskers may also be used. For an additional description of single crystal whiskers see Katz, H. S. and Milewski, J. V., *Handbook of Fillers and Reinforcements for Plastics*, pages 446–464 (C. 25) (Von Nostrand Reinhold Co., N.Y. 1978).

Short fiber materials of the polycrystalline type are to be distinguished from the single crystal whiskers used in this invention. The polycrystalline filaments or chopped fibers are much larger in diameter e.g., 10 microns or larger. .As taught in the Wei patent referred to above, the polycrystalline fibers "suffer considerable degradation due to grain growth at temperatures above about 1250° C. which severely limited their use in high temperature fabrication processes such as hotpressing for producing ceramic composites of nearly theoretical density. Further, during high pressure loadings such as encountered during hot pressing, the polycrystalline fibers undergo fragmentation which detracts from the reinforcing properties of the fibers in the ceramic composite. Also, these polycrystalline fibers provided insufficient resistance to cracking of the ceramic composite since the fibers extending across the crack line or fracture plane possess insufficient tensile strength to inhibit crack growth through the composite especially after the composite has been fabricated by being exposed to elevated pressures and temperatures in hot pressing."

Also see Milewski, J. V. "Short-Fiber Reinforcements: Where The Action Is", *Plastics Compounding*, November/December 1979, pages 17-37. A clear distinction is drawn between single crystal "whiskers" and polycrystalline "microfibers" on pages 17-19.

It will be recognized that the ceramic whiskers must be of a composition compatible with the ceramic matrix composition. Since most of these materials are sufficiently compatible with each other, it should pose no problem to those skilled in the art to avoid the few instances where there may be incompatible combinations.

It will also be understood that the whiskers must be bound in the matrix in a manner so as to produce reinforcement of the matrix. The particular nature of bonding reinforcement is imperfectly known. However, the general considerations for good reinforcement have been described by a number of investigators. One concise description is found in Katz et al, *Handbook of Fillers and Reinforcements for Plastics*, 454-457 (1978). We have found that bonding is satisfactory and good reinforcement is obtained for the cutting tools of the present invention when the ceramic whisker content is in the range of from about 2-40% (such as 12-35%, 18-30%, and particularly 24-30%) volume percent of the whisker/matrix composite. (This of course results in the percentage of matrix material being 60–98%). Above about 40% whisker content the addition of whiskers becomes detrimental to the toughness. It is believed that this may be due either to the whisker content becoming sufficiently large that zones of whisker concentration themselves have a limited toughness or that the ceramic matrix develops points at which the matrix cohesiveness is reduced. Below about 2% there is insufficient whisker content to provide adequate reinforcement.

The preferred ranges of whisker content will depend on the type of cutting services for which the tool is designed. Whiskers can be present in low levels (about 2–12% by volume) and medium to higher levels (e.g. about 12–40% and 12–35% by volume). Lower contents (about 2–12%) are generally better when the tool is to be used for types of cutting (e.g. turning) where the cutting force is applied relatively continuously and heat builds up in the tool matrix. Where the ceramic force is applied in a more interrupted or intermittent manner, however, the higher contents (e.g. 20–35%) are more preferred. A cutting tool comprised of about 25 volume percent silicon carbide whiskers in alumina matrix provides especially outstanding performance. It will be recognized that there may be a certain amount of routine experimentation required to determine the optimum content for a given end use; however, such should be easily performed by one skilled in the art.

Typical examples of tools of this invention are illustrated in Table I. The data in Table I were derived from an experiment in which fracture toughness ($K_c$) was measured for samples composed of alumina matrix containing the ARCO Chemical Company silicon carbide whiskers.

TABLE I

| Whisker Content, vol. pct. | Fracture Toughness, MPa $\sqrt{m}$ |
|---|---|
| 0 | 4.15 |
| 18 | 6.9 |
| 24 | 8.9 |
| 30 | 8.7 |
| 35 | 7.6 |

Similar increases in toughness can be expected for other ceramic matrices. For instance, ceramic matrices composed of silicon nitride or alumina doped with titanium carbide both have fracture toughness on the order of 1.5 times greater than the fracture toughness of alumina matrices. It is anticipated that the same degree of fracture toughness improvement with whisker reinforcement as shown for alumina in Table I would also apply to the silicon nitride and alumina/titanium carbide matrices.

The ceramic cutting tools of this invention are formed by first blending the proper proportions of the ceramic matrix material in powdered form with the ceramic whiskers. A wide variety of systems are known for mixing of particulate solids. Typical are those described in Perry et al, *Chemical Engineers' Handbook*, 21-30 to 21-36 (5th edn., 1973). The blending must be such that the whiskers are thoroughly dispersed throughout the particulate ceramic matrix material, but not be so severe that the whiskers are significantly degraded. A presently preferred method is described in U.S. Pat. No. 4,463,058.

Once the ceramic matrix material and the ceramic whiskers are thoroughly blended, the formation of the composite cutting tools then proceeds in the same manner as formation of conventional unreinforced ceramic tools. Typically the tools are formed by molding under pressures 3,000–60,000 psi (200–4200 kg/cm$^2$) and either simultaneously or subsequently sintered at temperatures on the order of 1500–3200° F. (800–1750° C.). The particular shape molded will of course depend on the intended function of the cutting tool.

The improved ceramic tools of this invention have a high degree of toughness and wear resistance. In especially preferred practice, the cutting tools are replaceable inserts of the standard geometry employed in the cutting industry for such varied cutting tool and cutting tool insert applications as turning, facing, milling, boring, and the like. Machining processes employing the cutting tools of this invention are generally described in "Practical Machining Principles for Shop Application" by Metcut Research Associates, Inc. (1981) 3980 Rosslyn Drive, Cincinnati, Ohio 45209 incorporated herein by reference.

The markedly-improved products of this invention are illustrated in Table 2 below. In these examples various types of ceramic cutting tools were used for slab mill cutting of cast iron at a rate of 2,000 surface feet/minute (600 surface meters/minute) using 0.040 inch (1.0 mm) depth of cut. The "tool life" indicates the number of inches of metal cut before the tool failed by breakage.

TABLE 2

| Cutting Tool Composition | Tool Life, Inches Cut |
|---|---|
| Alumina/TiC | 22 |
| Silicon Nitride/TiC | 42 |
| Silicon Nitride (SiAlON) | 44 |
| Alumina/25% SiC whiskers | 504[a] |

[a]test terminated; no tool failure

It will be immediately evident that the reinforced tool provided more than an order of magnitude improvement in tool life, which leads to greatly increased productivity, even though the test with the reinforced tool was terminated short of tool failure. While some steel and carbide cutting tools can provide long tool lives, none of them can operate at the high cutting speeds that the ceramics can. On the other hand, the data of Table 2 clearly show that the unreinforced ceramics, while operating at the high cutting speed, have unacceptably short tool lives. The reinforced cutting tools of the present invention, however, clearly combine the best properties of both types of prior art tools without the deficiencies of either one.

In further illustration of the invention, cutting tool inserts comprised of alumina matrix containing varying amounts of silicon carbide whiskers were prepared and tested in face milling tests. For comparison conventional inserts were also prepared and tested.

The inserts of the invention were formed by thoroughly blending finely powdered alumina with the appropriate quantity of the silicon carbide whiskers used in the preceding example and hot pressing the blend at 280 kg/cm$^2$ and 1850° C. and 1 hour to form an insert blank having a theoretical density in excess of 99%. The blanks were finished ground to form SNG-432 shape ceramic cutting inserts.

The face milling tests were performed on a Cincinnati No. 5 vertical milling machine. This machine was equipped with a 40-horsepower D.C. variable speed drive motor for the spindle and a 10 horsepower A.C. variable speed drive motor for the table feed.

The work material was Class 30 gray cast iron. The configuration of the turning workpiece was 12-inch O.D. by 8-inch I.D. by 13-inch long. These tubes had a hardness of 179 BHN. The bars used for the single-tooth milling test were 2 inches by 4 inches by 12 inches. The surface scale was removed from all test workpieces before any tests were performed. All the tools, except tool insert A had an edge preparation of 0.006 inch by 30°. Tool insert A edge preparation was 0.006 inch by 20°. The tests with all tools were stopped when the wear on the side cutting edge was 0.010-inch uniform wear, 0.020-inch localized wear, or tool failure.

Conditions of milling were as follows:
Cutting Speeds: 2000 and 6000 feet/minute
Feeds: 0.040, 0.080, and 0.100 inch/tooth
Depth of Cut: 0.050 inch
Width of Cut: 4.0 inches
Setup: On center
Cutting Fluid: Dry
Work Material: Class 30 Gray Cast Iron, 179 BHN
Tool Material: SNG-432 inserts
Geometry:
  Axial Rake: −5° End Cutting Edge Angle: 15°
  Radial Rake: −5° Radial Relief: 5°
  Corner Angle: 15° Nose Radius: 0.030 inch
  Radial Depth of Cut: 4.0 inches
  Axial Depth of Cut: 0.050 inch
  Setup: On center
  Cutting Fluid: Dry
  Tool Life End Point: 0.010-inch uniform wear, 0.020-inch localized wear, tool failure.

The results of the single-tool face milling tests are presented in Table 3 and in FIGS. 1 and 2. These tests are designed to evaluate the toughness of the cutting tools. The cutting speed was set at a constant 2000 feet/minute. The initial chip load was 0.040 inch/tooth. The depth of cut and width of cut were 0.050 inch and 4.0 inches, respectively. At this set of conditions, the Si₃N₄/30% TiC, the Si₃N₄/alumina and the aluminum/30% TiC inserts broke after 44, 42, and 27 inches of work travel. All the other tools were tested until a minimum of 108 inches of work travel was achieved without breakage. The chip load was then increased to 0.080 inch/tooth, and the remaining five tools were tested. The results are presented in FIG. 1.

The 25% SiC whisker insert of the invention had 336 inches of work travel without breaking. An additional test was performed to verify this result. The second test was stopped at 119 inches of work travel without breaking. This tool was then tested at a chip load of 0.100 inch/tooth. At this chip load, it was tested for 204 inches of work travel before the test was stopped without breaking. All other tools broke at the 0.080 inch/tooth chip load. These tools were also tested at 6000 feet/minute and 0.005 and 0.010 inch/tooth feeds.

The results of these tests are presented in Table 3 and as tool life versus feed curves in FIG. 2. The superiority of the cutting tools of this invention over comparable commercial tools is apparent.

TABLE 3

| CUTTING SPEED Ft/min | FEED in/tooth | TOOL LIFE -- inches of work travel | | | | | | | |
|---|---|---|---|---|---|---|---|---|---|
| | | A | B | C | D | 15% SiC | 20% SiC | 30% SiC | 25% SiC |
| 2000 | 0.040 | 42 | 44 | — | 27 | 108* | 108* | 108* | 108* |
| 2000 | 0.080 | — | — | 34 | — | 69 | 81 | 25 | 336,119* |
| 2000 | 0.100 | — | — | — | — | — | — | — | 204* |
| 6000** | 0.0005 | 144 | 144 | 252 | 144 | 228 | 216 | 192 | 180 |
| 6000** | 0.010 | 336 | 252 | 456 | 360 | 552 | 552 | 504 | 480 |

*Did not fail at this level of tool life.
**All failures at 6000 feet/minute were due to wear, while all failures at 2000 feet/minute were due to insert fractures.
A—Commercial Si₃N₄/Alumina insert
B—Commercial Si₃N₄/30% TiC insert
C—Commercial Si₃N₄ insert
D—Commercial alumina/30% TiC insert To further demonstrate the advantages achieved with the cutting tools of this invention as compared with conventional cutting, additional runs were made, the results of which are presented below. In the following, the 25% SiC insert was a 25 volume % silicon carbide whisker in alumina matrix material prepared by the procedure given in the preceding example. Insert E was a conventional alumina (4% zirconia) insert, and insert G was a conventional Si₃N₄ insert with added AlN, Al₂O₃ and Y₂O₃ sintering aids. The insects are compared in a number of different cutting applications.

| Facing of cast iron |
|---|

Work material: Cast iron Meehanite GC, Hardness 185 HV
Insert style: SNGN 120416T
Tool life criterion: 1 mm maximum flank wear or premature fracture
Cutting data
Feed: 0.2 mm/rev
Depth of cut: 2 mm
Speed: 700 m/min and 450 m/min

| | Result | | | |
|---|---|---|---|---|
| | 700 m/min | | 450 m/min | |
| Grade | R | S | R | S |
| 25% SiC | 1.69 | 42 | 1.52 | 54 |
| E | 1.07 | 104 | 0.080 | 113 |
| G | 1.00 | 97 | 1.00 | 57 |

R = Edge life ranking
S - Edge life scatter = Maximum - minimum lifetime in % of mean life time The 25% SiC whisker reinforced alumina insert of the invention showed increased lifetime and reduced lifetime scatter compared to a alumina ceramic E and silicon nitride ceramic G in this intermittent cutting operation.

| Fracture resistance in intermittent cutting of nodular cast iron |
|---|

Work material: Nodular cast iron SS 0737-00, Hardness 270 HB
Insert style: SNGN 120416T
Tool life criterion: Bulk fracture
Cutting data
Feed: 0.38 mm/rev
Depth of cut: 3 mm
Speed: 500 m/min Result -continued

| Fracture resistance in intermittent cutting of nodular cast iron | |
|---|---|
| Grade | Relative tool life |
| 25% SiC | 1.24 |
| G | 1.00 |
| E | Not tested - too severe conditions |

The insert of the invention was a tougher material than insert G in intermittent cutting of cast iron. In this test the work material is designed to exert very strong intermittent forces and thermal cycling of the tool tip. Alumina ceramics are less tough than silicon nitrides ceramics. Thus, the SiC whisker reinforced ceramic is strengthened to a toughness behavior superior to silicon nitride while retaining the wear resistance of alumina.

| Turning of hardened steel | |
|---|---|

Work material: Hardened steel SS 2310, Hardness 64 HRC
Insert style: SNGN 120461T
Tool life criterion: Fracture
Cutting data
Feed: 0.23 mm/rev
Depth of cut: 0.5 mm
Speed: 60 m/min

| | Result |
|---|---|
| Grade | Relative tool life |
| 25% SiC | 1.60 |
| G | 1.00 datum |

The SiC whisker reinforced insert of the invention performed better than insert G in continuous turning of hardened steel.

| Turning of heat resistant alloy Inconel 718 | | | |
|---|---|---|---|

Work material: Inconel 718, Solution treated and aged
Insert style: SNGN 120412E
Tool life criterion: Flank wear and/or rake face flaking

| Cutting data | | | |
|---|---|---|---|
| Feed, mm/rev | 0.25 | 0.15 | 0.15 |
| Depth of cut, mm | 2 | 2 | 2 |
| Speed, m/min | 180 | 180 | 130 |
| | Flood coolant in all tests | | |

| Grade | Mean edge life ranking | Mean flank wear resistance ranking[1] | Mean depth of cut notch resistance ranking[1] | Mean trailing edge notch wear resistance ranking[1] |
|---|---|---|---|---|
| 25% SiC | 1.68 | 1.24 | 1.09 | 2.00 |
| G | 1.00 | 1.00 | 1.00 | 1.00 datum |

[1]Wear resistance = 1/wear rate.

The SiC whisker reinforced insert performed better than insert G and had a high degree of security and wear resistance.

| Turning of heat resistant alloy Incoloy 901 | | | |
|---|---|---|---|

Work material: Incoloy 901 Solution treated and aged
Insert style: SNGN 120412E
Tool life criterion: Flank wear and/or rake face flaking

| Cutting data | | | |
|---|---|---|---|
| Feed, mm/rev | 0.15 | 0.25 | 0.15 |
| Depth of cut, mm | 2 | 2 | 2 |
| Speed, m/min | 310 | 180 | 180 |
| | Flood coolant in all tests | | |

| | Result | | |
|---|---|---|---|
| | Mean | Mean flank | Mean depth | Mean trailing edge notch |

-continued

| Turning of heat resistant alloy Incoloy 901 | | | | |
|---|---|---|---|---|
| Grade | edge life ranking | wear resistance ranking[1] | of cut notch resistance ranking[1] | wear resistance ranking[1] |
| 25% SiC | 1.04 | 1.04 | 0.78 | >>1 (no wear |
| G | 1.00 | 1.00 | 1.00 | 1.00 datum |

[1]Wear resistance = 1/wear rate.

The SiC whisker reinforced insert was suitable for the turning of Incoloy 901 and had a slightly better edge life than G. A great advantage is that the lack of trailing edge notch wear consistently maintains a good surface finish.

The industrial applicability of the present invention lies in the field of metal cutting. The cutting tools of the present invention can be used in virtually any industrial field in which metal cutting is a factor. Typical of the industries in which these cutting tools would be advantageous are the automotive, aircraft, structural metals and general metal working industries.

It will be evident that there is a wide variety of embodiments of the present invention which are not specifically described above but which are clearly within the scope and spirit of the present invention. The above description is therefore intended to be exemplary only and the scope of the invention is to be limited solely by the appended claims.

What is claimed is:

1. A sintered composite cutting tool comprising a cutting edge for metal, said tool consisting essentially of:
   a matrix consisting essentially of alumina; and
   silicon carbide whiskers in an amount within the range of 2-40 volume percent thoroughly distributed through said matrix.

2. The cutting tool of claim 1 wherein the alumina is present in amounts of 65-80 volume percent and the silicon carbide whiskers are present in amounts of 20-35 volume percent.

3. The cutting tool of claim 1 wherein the alumina is present in amounts of 88-98 volume percent and the silicon carbide whiskers are present in amounts of 2-12 volume percent.

4. The cutting tool of claim 1 wherein the silicon carbide whiskers are present in amounts of 12-40 volume percent.

5. The cutting tool of claim 1 wherein the silicon carbide whiskers are present in amounts of 12-35 volume percent.

6. The cutting tool of claim 1 wherein the silicon carbide whiskers are present in amounts of 18-30 volume percent.

7. The cutting tool of claim 1 wherein the silicon carbide whiskers are present in amounts of 24-30 volume percent.

8. The cutting tool of claim 1 wherein the silicon carbide whiskers are present in an amount of about 25 volume percent.

9. The cutting tool of claim 1 wherein said whiskers have a monocrystalline structure and exhibit an average diameter of about 0.6 microns and aspect ratios of about 15-150.

10. The cutting tool of claim 9 wherein said whiskers consist essentially of beta silicon carbide whiskers.

11. The cutting tool of claim 1 wherein said composite exhibits a theoretical density above 99%.

12. A sintered cutting tool comprising a cutting edge for metal and consisting essentially of: a matrix consisting essentially of alumina; and silicon carbide whiskers in amounts of 2-40 volume percent thoroughly distributed through said matrix, said cutting tool being made by a process comprising:

thoroughly blending said alumina matrix material in powdered form with said silicon carbide whiskers;

pressing the blended alumina matrix and whiskers at a pressure within a range from about 3,000-60,000 psi into a shape having at least one edge;

sintering the pressed blend of alumina matrix and whiskers at a temperature within a range from about 1500-3200° F.; and finishing said at least one edge to exhibit a cutting edge for metal.

13. The cutting tool of claim 12 wherein said cutting edge exhibits an edge preparation of 0.006 inch by 30°.

14. The cutting tool of claim 12 wherein said cutting edge exhibits an edge preparation of 0.006 inch by 20°.

* * * * *